US007933789B2

(12) United States Patent
Boland et al.

(10) Patent No.: US 7,933,789 B2
(45) Date of Patent: Apr. 26, 2011

(54) METHOD AND SYSTEM FOR ACCESSING DECLINED EVENT INVITATIONS

(75) Inventors: Conor Terance Boland, Baldoyle (IE); Garreth Browne, Lusk Village (IE); Marie Helene Brohan Delhaye, Dublin (IE); Patrick Joseph O'Sullivan, Ballsbridge (IE)

(73) Assignee: International Business Machines Corporation, Armonk, NY (US)

( * ) Notice: Subject to any disclaimer, the term of this patent is extended or adjusted under 35 U.S.C. 154(b) by 634 days.

(21) Appl. No.: 11/564,837

(22) Filed: Nov. 29, 2006

(65) Prior Publication Data

US 2007/0198316 A1    Aug. 23, 2007

(30) Foreign Application Priority Data

Feb. 4, 2006   (GB) .................................. 0602296.6

(51) Int. Cl.
*G06Q 10/00* (2006.01)
*G06F 9/46* (2006.01)
*G06F 15/16* (2006.01)
(52) U.S. Cl. ................................ 705/5; 705/9; 709/204
(58) Field of Classification Search .................. 705/5, 9; 709/204
See application file for complete search history.

(56) References Cited

U.S. PATENT DOCUMENTS

| 6,016,478 | A | * | 1/2000 | Zhang et al. ..................... 705/9 |
| 6,094,681 | A | * | 7/2000 | Shaffer et al. ................. 709/224 |
| 6,519,629 | B2 | * | 2/2003 | Harvey et al. ................. 709/204 |
| 6,965,917 | B1 | * | 11/2005 | Aloni et al. .................... 709/206 |
| 7,082,402 | B2 | * | 7/2006 | Conmy et al. .................... 705/8 |
| 7,519,663 | B1 | * | 4/2009 | Bostick et al. ................ 709/204 |
| 2003/0154116 | A1 | * | 8/2003 | Lofton ............................. 705/8 |
| 2004/0199412 | A1 | * | 10/2004 | McCauley ....................... 705/8 |
| 2005/0033615 | A1 | * | 2/2005 | Nguyen et al. .................. 705/5 |
| 2005/0044503 | A1 | * | 2/2005 | Richardson et al. .......... 715/753 |
| 2005/0216842 | A1 | * | 9/2005 | Keohane et al. .............. 715/733 |
| 2006/0184885 | A1 | * | 8/2006 | Hayes et al. .................. 715/753 |
| 2006/0190485 | A1 | * | 8/2006 | Adams et al. ............... 707/104.1 |
| 2006/0190547 | A1 | * | 8/2006 | Bhogal et al. ................. 709/207 |
| 2006/0224969 | A1 | * | 10/2006 | Marston ....................... 715/753 |
| 2007/0073810 | A1 | * | 3/2007 | Adams et al. ................ 709/205 |
| 2007/0198316 | A1 | * | 8/2007 | Boland et al. .................... 705/8 |

OTHER PUBLICATIONS

Nyamgondalu, Nagendra, "Lotus Notes Calendar and Scheduling explained" IBM developerWorks. Oct. 2004 Web. Dec. 9, 2004, http://web.archive.org/web/20041209233627/www-106.ibm.com/developerworks/lotus/library/cs-pt1.*
Mann, Bill. "How to Do Everything with Microsoft Office Outlook 2003," McGraw-Hill/Osborne, 2003, pp. 172-187, 192-195, 205-208,404-408.*

* cited by examiner

*Primary Examiner* — John W Hayes
*Assistant Examiner* — Tonya Joseph
(74) *Attorney, Agent, or Firm* — David A. Dagg

(57) ABSTRACT

A method and system for accessing declined invitations is provided. The method includes receiving notification of an available time slot, retrieving stored declined event invitations, and presenting the declined event invitations to a user. The user can accept of a previously declined event invitation for the available time slot. When the user receives an event invitation and declines the event invitation, the method includes saving the declined event invitation to a data store from which it may be retrieved. Stored declined event invitations are deleted once the time of the event has passed.

19 Claims, 6 Drawing Sheets

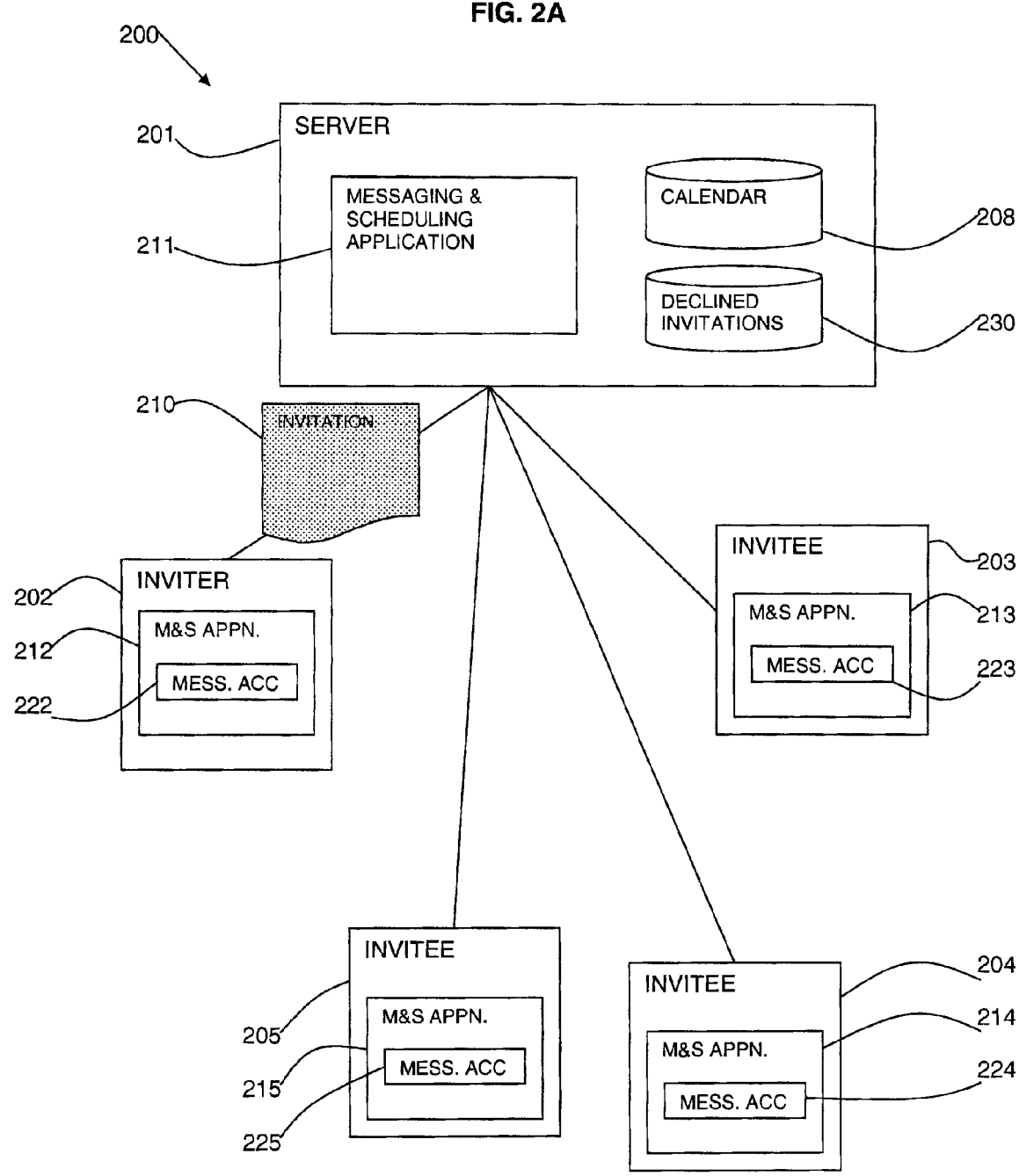

METHOD AND SYSTEM FOR ACCESSING DECLINED EVENT INVITATIONS

CROSS REFERENCE TO RELATED APPLICATIONS

The present application claims priority under 35 USC 119 to United Kingdom Application Number GB0602296.6, filed Feb. 4, 2006.

FIELD OF THE INVENTION

This invention relates to the field of messaging and scheduling software. In particular, it relates to accessing declined event invitations in order to accept a previously declined event.

BACKGROUND OF THE INVENTION

Messaging and collaborative software has increasing importance in the workplace. Software that allows users to schedule their work commitments and communicate such scheduling effectively and efficiently to other participants can promote work productivity by removing administrative burden from the users. IBM's Lotus Notes/Domino architecture (IBM Lotus Notes and Domino are trade marks of International Business Machines Corporation) provides such software which connects and integrates users' resources including email, calendars and schedules, journals, to do lists, Web pages and databases.

Users, in the course of a working day, can receive invitations to many events. Inevitably some of them will coincide and the user will only be able to accept the invitation to one of them. Again, inevitably some of the events to which a user accepts an invitation will be cancelled or rescheduled. When a event is cancelled or rescheduled the user is free to accept a different invitation at that particular time. A problem arises in selecting a previously declined event.

To take an example, a user receives invitations to a number of meetings which are scheduled for a Thursday at 2 pm. One of the invitations is from the user's manager. This meeting being a priority the user accepts the manager's invitation and declines all others. Some time before the manager's meeting the user receives a mail from their manager rescheduling the meeting for a later date. The Thursday 2 pm time slot is now free for any of the other meetings previously declined.

The problem for the user is knowing what other events are now available for the freed time slot. At this stage a user has probably forgotten what other invitations he had received. The event invitations may be buried deep in the user's mail file and the user would have to spend an inordinate amount of time searching for them. The declined invitations may have been deleted from the mail file and so the user is no longer aware of what events he is now free to attend.

Conventional art can mark invitations as declined but cannot prompt the user that such invitations can be reactivated when a particular time slot becomes free.

Currently, users may tentatively accept invitations to all events knowing that some are likely to be cancelled or rescheduled. Users do this so that they do not forget that other events are available should one of them be cancelled or rescheduled. However, this is not a good scheduling practice and leads to confusion and last minute cancellations of attendance at previously accepted events.

SUMMARY OF THE INVENTION

According to a first aspect of the present invention there is provided a method for accessing declined event invitations, comprising: receiving notification of an available time slot; retrieving stored declined event invitations; and presenting the declined event invitations to a user for acceptance of an event invitation for the available time slot.

When a client receives an event invitation and declines the event invitation, the method may save the declined event invitation to a data store.

The step of retrieving may access invitations to all previously declined event invitations. Alternatively, the step of retrieving may access invitations to previously declined event invitations overlapping the available time slot. In either case. The step of presenting may also present event invitations which have not been responded to, such as newly received event invitations or event invitations which have been ignored The notification of an available time slot may be in the form of a cancellation or rescheduling of a previously accepted event invitation.

Declined event invitations may be copied to a data store and the stored declined event invitations may be independent of the original received invitation. In this way, if an original received invitation is deleted, the stored declined event invitation persists. The stored declined event invitations may be deleted once the time of the event has passed.

The method may be carried out in a messaging system or a messaging and calendar system. In a messaging and calendar system, the method may include generating a notification of an available time slot when a calendar entry is deleted.

According to a second aspect of the present invention there is provided a system for accessing declined event invitations, comprising: means for notification of an available time slot; means for retrieving declined event invitations from a data store; and means for presenting the declined event invitations to a user for acceptance of an event invitation for the available time slot.

The system may be a messaging system including: a server running a messaging application; a plurality of clients running client applications of the messaging application. The messaging system may include a calendar means which is updated to indicate events.

The means for notification may be in the form of a graphical user interface with means for selecting an option to view previously declined event invitations. The means for presenting the declined event invitations may be in the form of a graphical user interface with means for selecting an event invitation for acceptance.

The data store may be coupled to the server, either on the server or attached to it. Alternatively, the data store may be provided locally to a client. The data store may be hidden from a user to prevent unintentional deletion of event invitations.

The system may include means for automatically removing event invitations from the data store once the time of the event has passed.

According to a third aspect of the present invention there is provided a computer program product stored on a computer readable storage medium, comprising computer readable program code means for performing the steps of: receiving notification of an available time slot; retrieving declined event invitations; and presenting the declined event invitations to a user for acceptance of an event invitation for the available time slot.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

FIGS. 2A and 2B are block diagrams of a system in accordance with the present invention;

DETAILED DESCRIPTION OF EXEMPLARY EMBODIMENTS

The method and system for accessing declined invitations to events are described in the context of a scheduling software system. The method and system could also be applied in a purely messaging software system. Invitations to events may include invitations to meetings, conference calls, seminars, etc.

Figure 1:
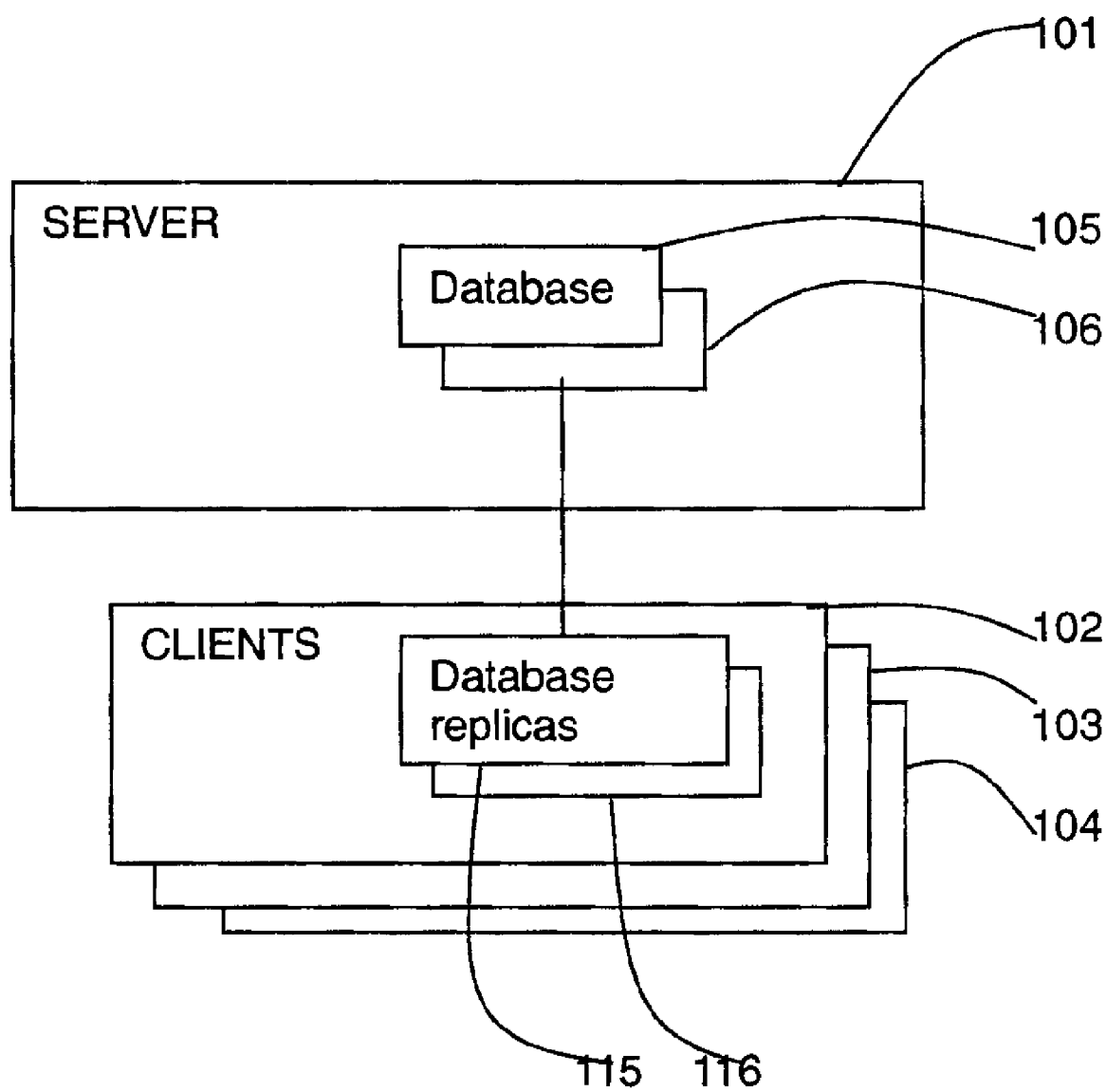
FIG. 1 is a block diagram of a client server system as known in the prior art.

Referring to FIG. 1, a basic architecture of a scheduling system is shown with a server 101 to which a plurality of client applications 102, 103, 104 are connected. The client applications 102, 103, 104 may communicate with the server 101 via a suitable network.

The server 101 holds a number of databases 105, 106. A database 105, 106 contains a collection of documents and other information. An email inbox is a form of database and each email message in the inbox is a document. A calendar is a database and each appointment in the calendar is a document. There are other types of databases for a number of other purposes.

An authoritative copy of each database 105, 106 resides on the server 101. A client application 102 can hold replicas 115, 116 of databases. A replica 115, 116 of a database is a copy of the database 105, 106 held on the server 101.

Referring to FIG. 2A, a system 200 is shown with a server 201 and a number of clients 202, 203, 204, 205 all connected via a network. All the clients run a software application 212, 213, 214, 215 with messaging and scheduling functionality and are connected via the server 201. The server 201 runs a server messaging and scheduling application 211 with a calendar 208. The server 201 has or is coupled to a data store 230 for declined event invitations. The data store 230 may be accessed via the network or may reside locally on the server 201.

Each client 202, 203, 204, 205 has its own messaging account 222, 223, 224, 225 which are actually stored on the server 201 with the clients having local replicas on their machines. Any of the clients can be an inviter 202 or an invitee 203, 204, 205 in accordance with the described method and system.

Each client 202, 203, 204, 205 has a local replica of its messaging account 222, 223, 224, 225. In reality, the information in these messaging accounts actually resides on the server 201, but the messaging accounts are "owned" by the clients. Similarly, clients 202, 203, 204, 205 may have local replicas of the calendar 208. FIG. 2A is intended to be a logical view showing ownership as opposed to actual physical location.

An inviter client 202 creates an invitation 210 to an event such as a meeting. The inviter client 202 adds a list of addresses of invitee clients 203, 204, 205 to the invitation 210.

When an invitee client 203, 204, 205 receives the invitation 210, the invitee client may respond to the invitation 210 to accept or decline it, or may ignore it.

The invitation 210 and the responses may be in the form of email messages in which case the address for an invitee is an email address and the messaging accounts are email accounts. The invitation 210 and responses may, alternatively, be another form or combination of forms of message such as a text message or other form of communication.

A method and system for tracking declined invitations is described. Declined invitations are stored so that they may be retrieved if a previously reserved time slot becomes available.

If an invitation 210 to an event is declined, a copy of the invitation 210 is stored in a separate data store 230 on the server 201. Alternatively, the declined invitations can be stored locally to the client 202, 203, 204, 205 to conserve server 201 resources. If desirable, the data store 230 may be hidden from the clients 202, 203, 204, 205 to avoid the accidental deletion of invitations 210. The invitations 210 are stored until the event time has expired at which point they can be safely purged from the system.

Figure 2B:
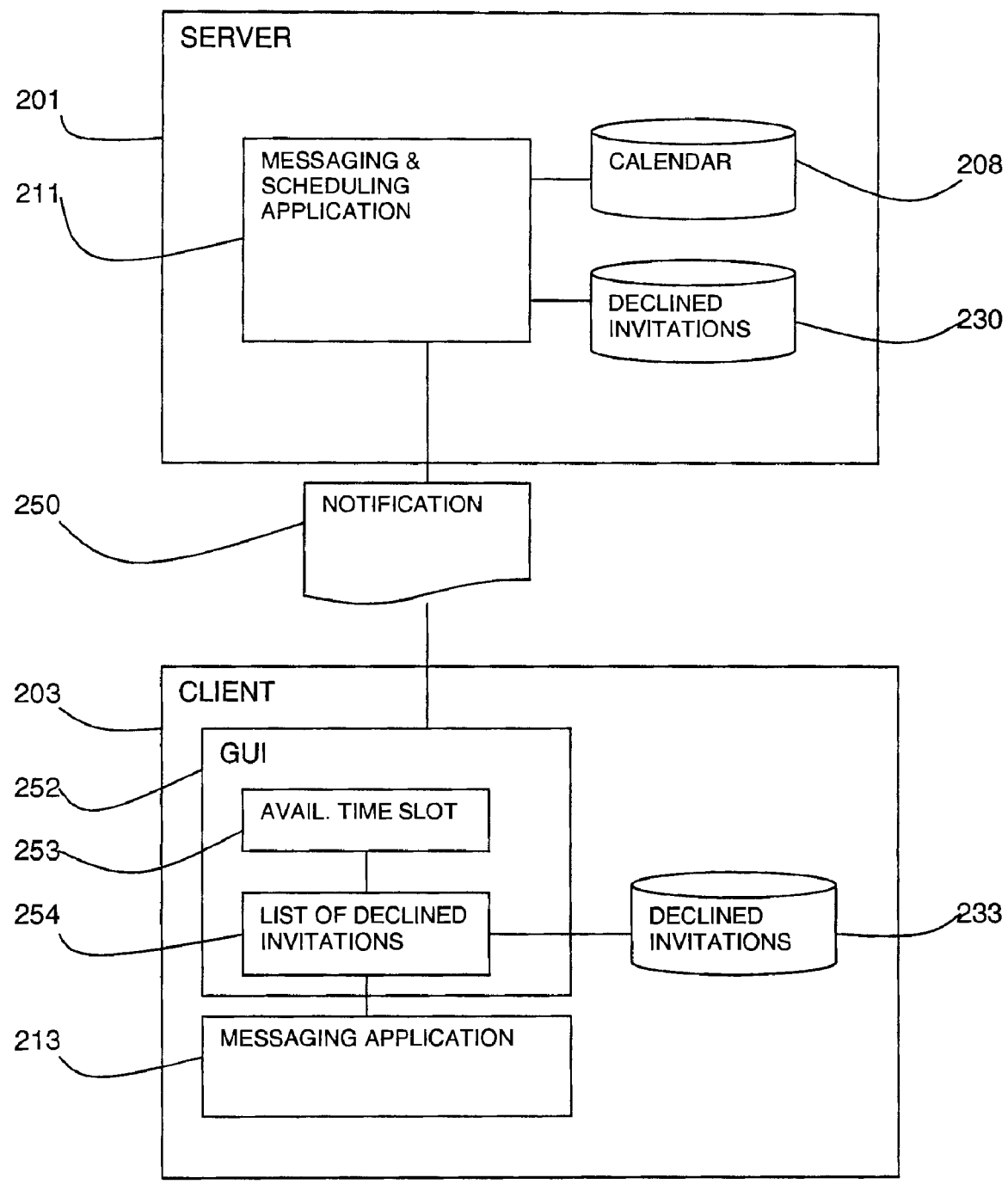

Referring to FIG. 2B, a previously scheduled event is cancelled or rescheduled leaving a time slot in the calendar 208 free. The cancellation is notified to a client 203 who was scheduled to attend the cancelled event. The cancellation notification 250 may include details of the freed calendar time slot. Alternatively, a separate notification may be sent to the client regarding re-scheduling previously declined events for this time slot.

The notification 250 prompts a graphical user interface 252 for use at the client 203 indicating the available time slot 253. The server 201 may retrieve the previously declined event invitations from the data store 230 if this is coupled to the server. Alternatively, the client 203 may retrieve the previously declined event invitations from a data store 233 local to the client. The graphical user interface 252 displays a list 254 of declined events on the client 203. Selection of a declined event from the list 254, activates the client's messaging application 213 and a message accepting the event invitation can be generated and sent. The list 254 may include any newly received invitations for the time slot.

The user can see overlapping events for the particular time on the list 254. For example, the event may be at 14:00 and the user may have another event at 14:30 so they could attend the first 30 minutes of the event if they so desired.

In one embodiment, the method and system may be incorporated into a mail application by identifying mail messages which are declined invitations to an event. The identified messages are stored in a dedicated data store such that they can be retrieved at a later time. When a new mail message is received which cancels or reschedules an accepted appointment, the user may retrieve the stored declined invitations. This may be done by retrieving all the stored declined invitations or by specifying the date and time of the cancelled event.

In another embodiment, the method and system may be incorporated into a messaging and scheduling application which includes a calendar of user's events. In this embodiment, the retrieval of declined invitations may be automated in response to a calendar vacancy.

Figure 3:
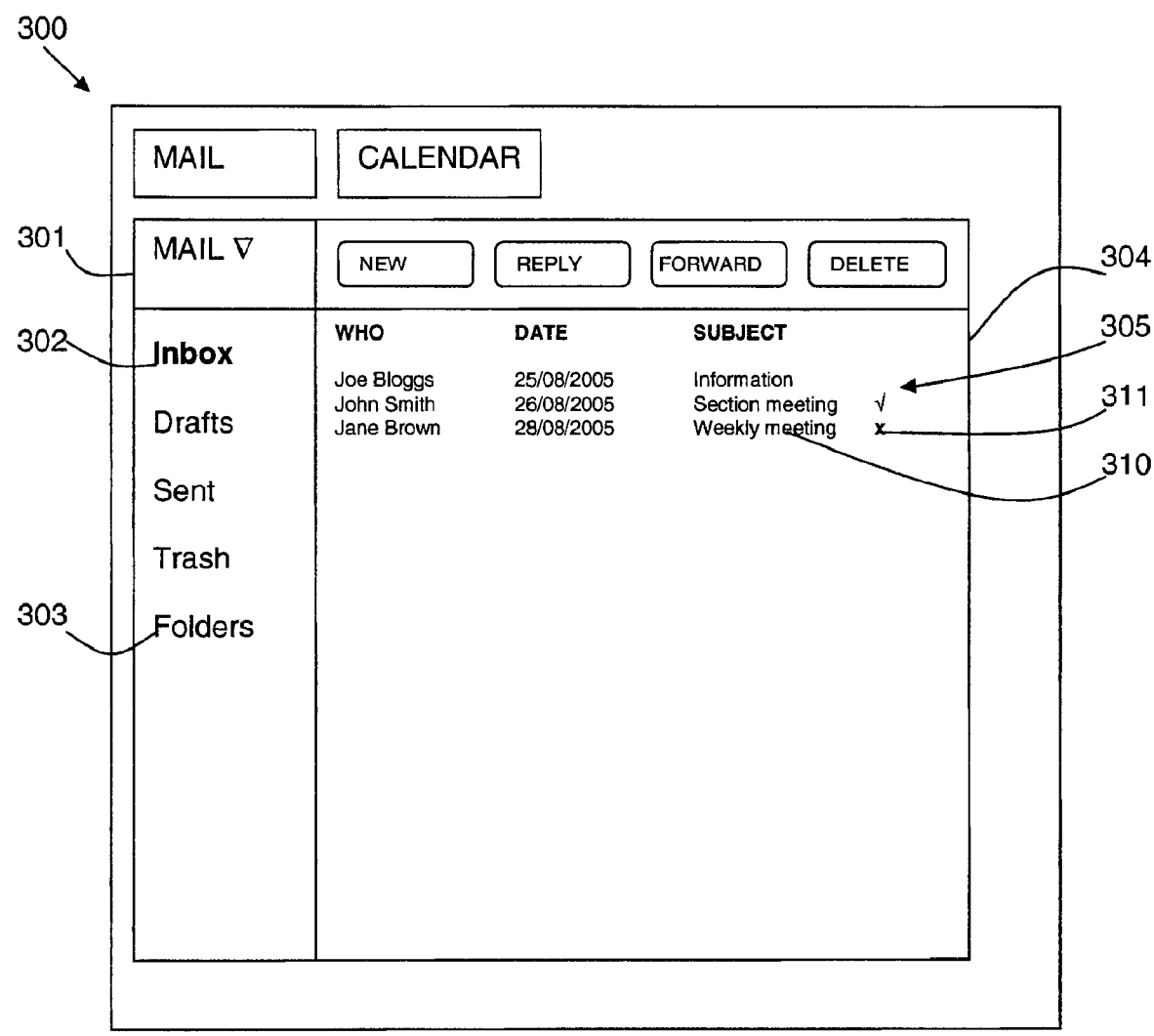
FIG. 3 is a graphical user interface of a messaging and scheduling application as known in the prior art.

Referring to FIG. 3, a graphical user interface 300 is shown of a messaging and scheduling application (such as 212, 213, 214, 215 of FIG. 2) as presented to a client (such as 202, 203, 204, 205).

A mail application has a graphical user interface 300 including an index 301 of mailboxes 302 and folders 303 for organizing messages. When a mailbox 302 is selected, the contents 304 is displayed with a list of received messages 305 summarized by their originator, date, size, subject, etc.

If a message 310 is an invitation to an event and a user declines the invitation, this may be displayed by providing a declined icon 311. However, an icon 311 is not required in the described method as the declined invitation is stored to a dedicated data store for declined invitations. The message 310 may remain in the mailbox 301 and is duplicated to the data store. The data store may be on the server, local to the user on the client system, or elsewhere but accessible on-line from the client system. The data store may take the form of any retrievable storage means.

Figure 4A:
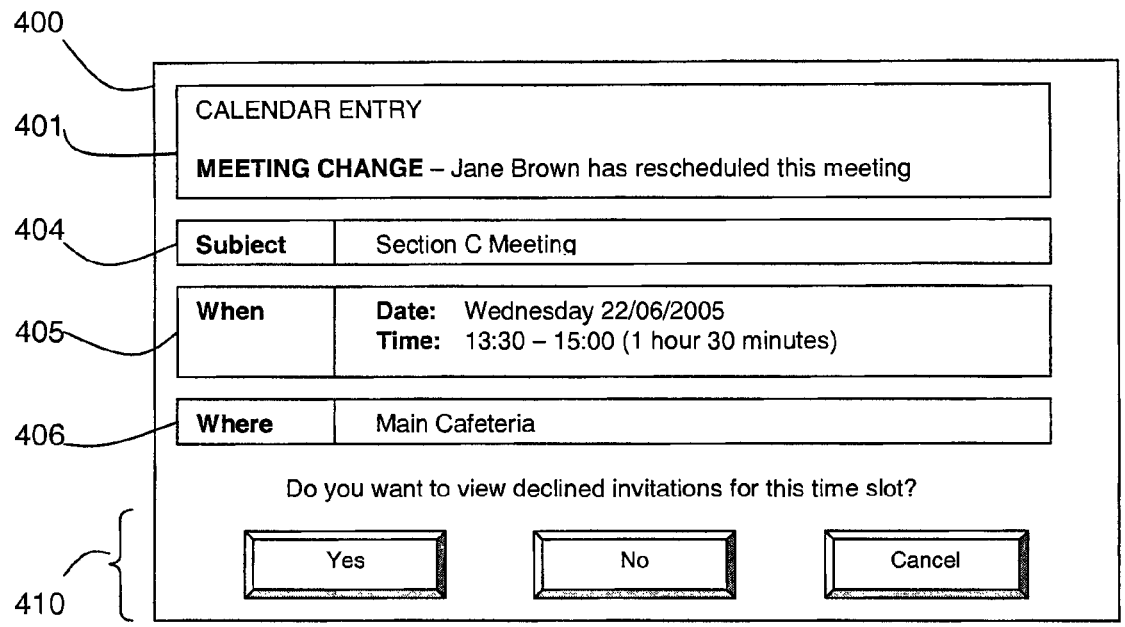
FIGS. 4A and 4B are graphical user interfaces in accordance with the present invention.
Figure 4B:
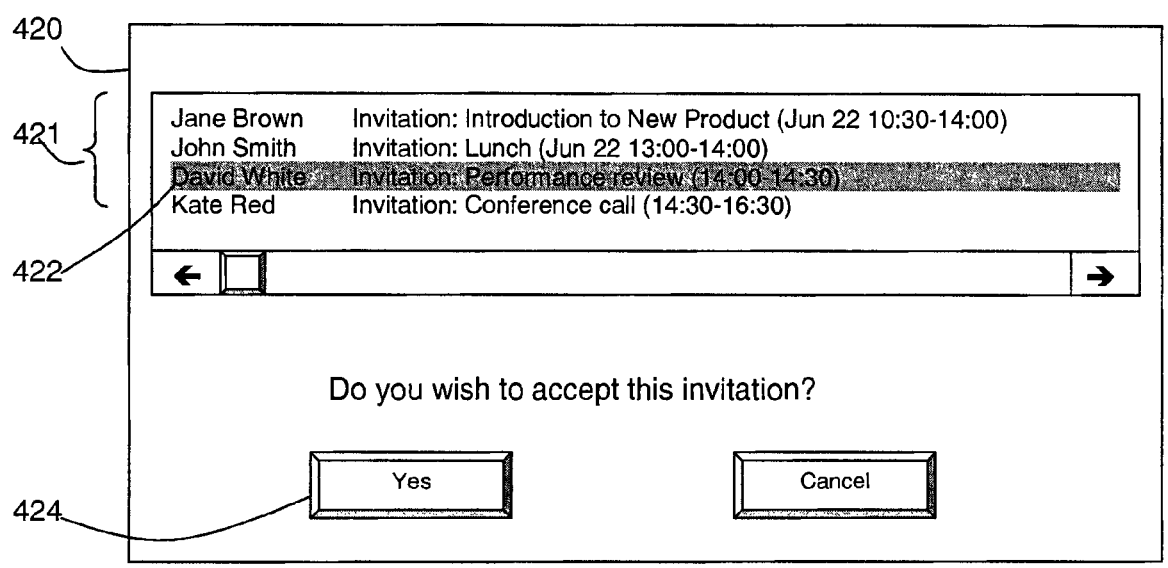

Referring to FIGS. 4A and 4B, if an update is received at a client in the form of a message indicating a change to an event, a graphical user interface 400 as shown in FIG. 4A is provided. The graphical user interface 400 identifies the event 401 and the change being made 402, for example, cancellation, rescheduling, etc. The attributes of the event may also be displayed including any changes, for example, the subject 404, the time and duration 405, and the location 406.

Option buttons 410 are provided in the user interface 400 to view declined invitations for the freed time slot. If the user selects to view declined invitations, a further user interface 420 is displayed as shown in FIG. 4B.

The further user interface 420 lists the previously declined invitations 421 and, optionally, any newly received invitations. The user can select a declined invitation and by highlighting the invitation of interest 422. Option buttons 424 allow the user to accept a highlighted invitation 422.

The declined invitations 421 can be displayed chronologically, by priority of attendance, or in another user defined order.

Figure 5:
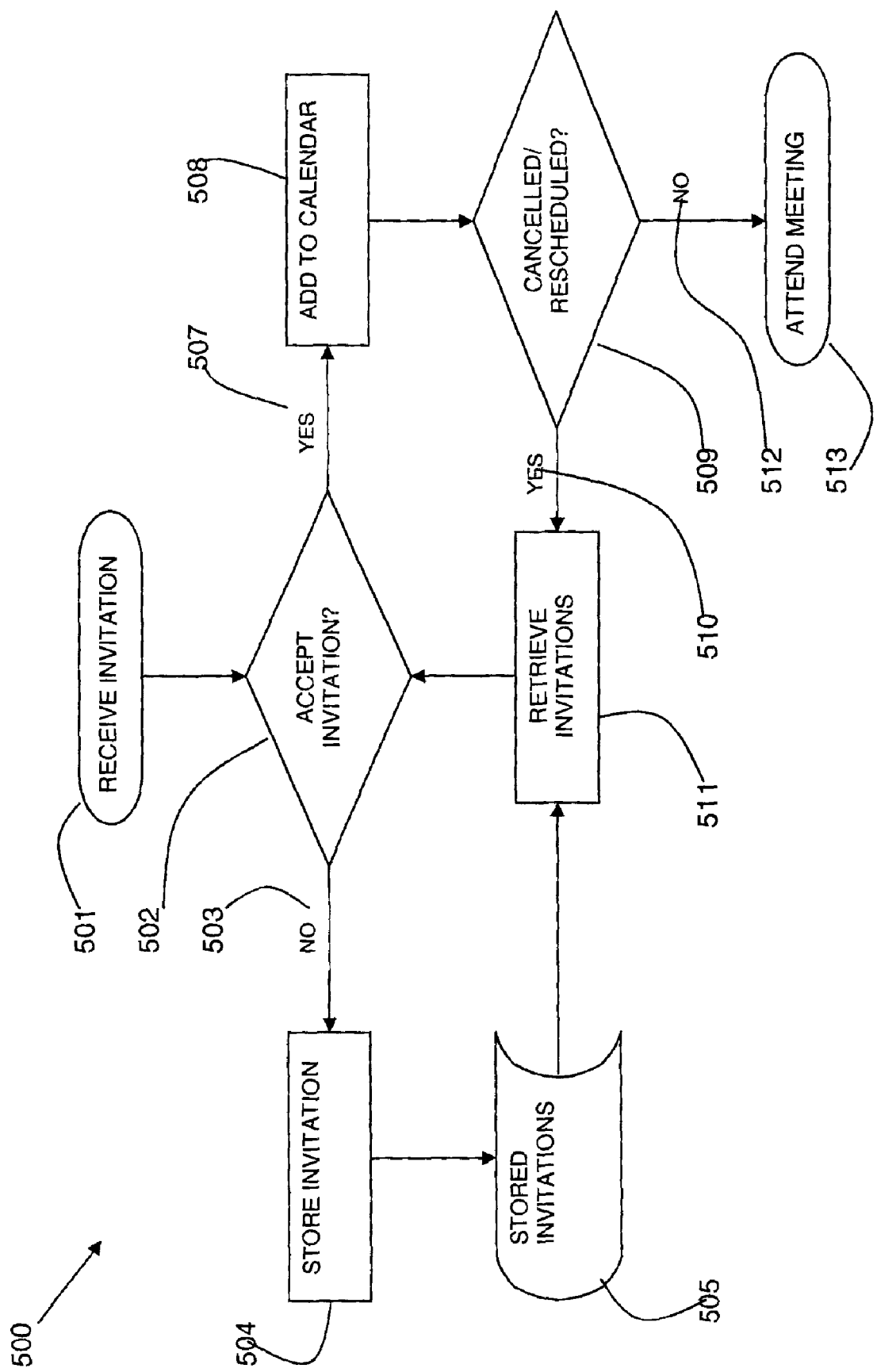
FIG. 5 is a flow diagram of the method in accordance with the present invention.

Referring to FIG. 5, a flow diagram 500 of the method of accessing declined invitations. A user receives an invitation 501 to an event. The user accepts, declines, or ignores the invitation 502. If the invitation in not accepted 503, it is stored 504 in a data store 505 of stored invitations.

If the invitation is accepted 507, the event is added to the user's calendar 508. It is determined if the event is later cancelled or rescheduled 509. If it is cancelled or rescheduled 510 the invitations are retrieved 511 from the data store 505 and another invitation may be accepted 502. If the event is not cancelled or rescheduled 512, the user attends the event 513.

In this way, a user receives invitations to multiple events for a particular time and accepts one invitation and declines the others. The declined events are moved to a special declined data store to be retrieved at a later date, if necessary. This ensures that the declined invitations are easily accessible. If no response is made to an invitation after a pre-determined time, it may be automatically be moved to the declined data store.

If an accepted event is cancelled/rescheduled and the time slot is freed. The application presents the user with a list of declined invitations and any newly received invitations for this particular time. The user accepts a new event and all other invitations are moved to the declined data store. An acceptance mail is sent to the chairperson.

The invitations to declined events, may be retrieved only for the time period of interest in which case, the invitations are stored with a reference to their date. Alternatively, all declined events may be retrieved and presented to the user and the user can browse the declined events to find any other events which he can now attend.

Any invitations which have passed their event time and date are automatically removed from the declined data store.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

We claim:

1. A method, embodied in at least one computer system, for accessing declined event invitations, including steps performed by said computer system comprising:
   detecting that a user has declined at least one event invitation sent to the user inviting the user to at least one associated event occurring during a time slot that is unavailable in the user's calendar;
   storing the declined event invitation to a data store, in response to detecting that the user declined the event invitation;
   determining, by the computer system, that the time slot in the user's calendar has become available;
   receiving notification that the time slot in the user's calendar has become available;
   retrieving, in response to receiving the notification that the time slot in the user's calendar has become available, the stored declined event invitation; and
   presenting, by the computer system, the retrieved declined event invitation to the user for acceptance by the user.

2. A method as claimed in claim 1, wherein the step of retrieving accesses all previously declined event invitations.

3. A method as claimed in claim 1, wherein the step of retrieving includes identifying and retrieving previously declined event invitations for events at times overlapping the available time slot.

4. A method as claimed in claim 1, further comprising presenting event invitations which have not been responded to to the user for acceptance of an event invitation for the available time slot.

5. A method as claimed in claim 1, wherein the notification of an available time slot is a cancellation or rescheduling of a previously accepted event invitation.

6. A method as claimed in claim 1, wherein the data store for storing declined event invitations is independent of the original received invitation.

7. A method as in claim 1, wherein the stored declined event invitations are deleted once the time slot has passed.

8. A method as claimed in claim 1, wherein the method is carried out in a messaging system.

9. A method as claimed in claim 8, wherein the messaging system includes the user's calendar, and the method includes generating the notification when an entry in the user's calendar is deleted.

10. A computer program product including a non-signal computer readable storage medium, the computer readable medium having program code stored thereon for accessing declined event invitations, the program code comprising:
    program code for detecting that a user has declined at least one event invitation sent to the user inviting the user to at least one associated event occurring during a time slot that is unavailable in the user's calendar;
    program code for storing the declined event invitations to a data store, in response to detecting that the user declined the event invitations;
    program code for determining that the time slot in the user's calendar has become available;
    program code for receiving notification that the of an available time slot in the user's calendar has become available;
    program code for retrieving, in response to receiving the notification that the time slot in the user's calendar has become available the stored declined event invitations; and
    program code for presenting the retrieved declined event invitations to the a user for acceptance by the user.

11. A system comprising:
    at least one processor and a computer readable memory, the computer readable memory having program code stored thereon for, when executed on the at least one processor, accessing declined event invitations, the program code comprising:
    program code for detecting that a user has declined at least one event invitation sent to the user inviting the user to at least one associated event occurring during a time slot that is unavailable in the user's calendar;
    program code for storing the declined event invitations to a data store, in response to detecting that the user declined the event invitations;
    program code for determining that the time slot in the user's calendar has become available;
    program code for receiving notification that the time slot in the user's calendar has become available;
    program code for retrieving, in response to receiving the notification that the time slot in the user's calendar has become available, the stored declined event invitations; and
    program code for presenting the declined event invitations to the user for acceptance by the user.

12. A system as claimed in claim 11, wherein the program code for retrieving accesses all previously declined event invitations.

13. A system method as claimed in claim 11, wherein the program code for retrieving identifies and retrieves invitations to previously declined event invitations for events at times overlapping the available time slot.

14. A system as claimed in claim 11, the program code further comprising program code for presenting event invitations which have not been responded to to the user for acceptance of an event invitation for the available time slot.

15. A system as claimed in claim 11, wherein the notification of an available time slot is a cancellation or rescheduling of a previously accepted event invitation.

16. A system as claimed in claim 11, wherein the data store for storing declined event invitations is independent of the original received invitation.

17. A system as in claim 11, wherein the stored declined event invitations are deleted once the time slot has passed.

18. A system as claimed in claim 11, wherein the program code is executed within a messaging system.

19. A system as claimed in claim 18, wherein the messaging system includes a the user's calendar, and the program code includes program code for generating the notification when an entry in the calendar is deleted.

* * * * *